United States Patent Office 3,102,364
Patented Sept. 3, 1963

3,102,364
CELLULOSIC MOLDED TRANSPLANTER POT OR OTHER PRODUCTS CONTAINING BAGASSE COMPONENTS
Joseph A. Pullen, New Iberia, La., assignor to Pullen Molded Products, Inc., New Iberia, La., a company of Louisiana
No Drawing. Filed July 3, 1961, Ser. No. 121,371
9 Claims. (Cl. 47—37)

This invention generally pertains to novel cellulosic molded products containing particular novel components and novel combinations of components. More exactly, this invention pertains to molded products formed at least in part from products derived from bagasse. In one of its preferred embodiments, this invention pertains to transplanter pot products containing bagasse pith associated with other fibrous material. In another of its preferred embodiments, this invention pertains to transplanter pot products containing appreciable amounts of *Tillandsia usneoides*. This application is a continuation-in-part of Serial No. 771,731, filed November 4, 1958 (now abandoned) and Serial No. 696,963, filed November 18, 1957 (now abandoned).

BACKGROUND AS TO TRANSPLANTER POTS

Whenever florists, horticulturists, and plant growers know that seeds and seedlings will have to be ultimately transported and transplanted to another location, they now initially plant the seed or seedling in perishable pots which, when set into the ground, will rot, disintegrate, or decompose so as to thereby give the roots of the plant free access to the surrounding soil. Pots and containers of this type are generically known as transplanter pots or interim pots. These transplanter pots have achieved considerable commercial success and acceptance by florists, horticulturists, and other plant growers because they minimize the shock of transplanting insofar as the plant is concerned and they avoid the retarded growth which is often associated with transplanting when transplanter pots are not employed.

Most of the transplanter pots heretofore proposed and used consist largely or entirely of some organic material. A wide variety of organic materials have been suggested for this use such as paper, wood chips, straw, peat, cardboard, manure, bagasse, peat moss, etc. However, despite the fact that many compounds have been proposed for use in transplanter pots, nearly all of the transplanter pots now on the market consist largely of peat moss, or a combination of peat moss and wood pulp. Transplanter pots of this type are currently being manufactured by forming a slurry of pulp, passing the pulp slurry into contact with a mold form, completing the molding operation on the mold form, and drying the molded product so formed.

SHORTCOMINGS AND DISADVANTAGES OF PRIOR ART TRANSPLANTER POTS

Hundreds of millions of decomposable transplanter pots of organic origin are manufactured and sold each year throughout the world. Nearly all of these transplanter pots contain substantial proportions of peat moss because this is a relatively inexpensive material which is available in large quantities in many sections of the world. However, one disadvantage of this material is that its natural tendency is to disintegrate only very slowly in the soil. The reason for this is that peat by its very nature has already been decomposing for centuries under anaerobic conditions beneath water and therefore when peat is taken out of water, dried and used as a component of a transplanter pot wall, it more or less defies further decomposition because it has essentially already gone through its full cycle of decomposition. Since the tender roots of a plant contained within a transplanter pot made of peat can usually not penetrate a wall of the relatively tough undecomposed peat material, manufacturers of this type of transplanter pot have been forced to resort to various measures in the hope of remedying this undesirable situation. One of the solutions which has been attempted is to try to encourage fungi to attack and decompose the peat. Since fungi need nitrogenous material to feed upon in order to live and since the peat contains very little nitrogenous material upon which the fungi can feed, manufacturers of peat transplanter pots have incorporated nitrogenous fertilizer components in the peat transplanter pot composition in order to encourage the fungi. The difficulty with this approach is that in order to promote the action of the fungi to a sufficient degree to result in rapid decomposition of the peat transplanter pot, the manufacturers have had to incorporate so much nitrogenous fertilizer material in the transplanter pot composition that the plant rootlets are burned upon coming into contact with the side walls of the transplanter pot. Since different types of plants have different tolerances insofar as the nitrogen fertilizer content of the wall is concerned, peat transplanter pot manufacturers have had to produce all of their pots so that the most sensitive plant which might be grown therein will not be adversely affected by the composition of the transplanter pot wall. Plants such as Saintpaulia, primula, gloxinias, and delphiniums are rather sensitive in this respect.

In addition to the above, transplanter pots made of peat or peat moss suffer a great disadvantage insofar as consumer attractiveness is concerned. First of all, the peat moss type of transplanter pot closely resembles manure, thus repelling many potential customers when such pots and the plant they contain are put on display for sale in nurseries and florist shops. Secondly, since the manufacturers have found it necessary to encourage the growth of fungi in an effort to decompose the peat component of the transplanter pot, when the fungi growth is promoted, unsightly green and black mold growths appear on the exterior of the transplanter pot which makes customers, and particularly women, reluctant to handle the transplanter pots.

OBJECTS

The primary object of this invention is to provide an improved composition having wide application as a container. Another object of this invention is to provide an improved transplanter pot for florists, gardeners and the like for the raising, transplanting, transporting and propagation of plants.

THE INVENTION BROADLY

In its broadest sense the present invention encompasses the idea of providing composite products comprising bagasse pith and a cellulosic fibrous material. In a more limited and preferred scope, this invention pertains to transplanter pots comprising a mixture of bagasse pith and cellulosic fibrous materials. In other preferred embodiments, this invention encompasses the idea of transplanter pot compositions comprising bagasse pith, a cellulosic fibrous material (preferably digested bagasse fiber) and one or more of the following materials: *Tillandsia usneoides* (Spanish moss), a wet strength resin and/or a fungicide.

BAGASSE PITH

As the bagasse leaves the last grinding mill in the sugar factory, it resembles crushed corn stalks and is composed of about 40% pith and 60% bast fibers on the dry basis. The pieces of bagasse may be of any size or length up to about 6 or 8 inches. Some of the pith cells are sometimes free of the fiber bundles but in the usual case most of the pith is found clinging to the fibers.

There are a number of known ways for separating the bagasse pith from the bagasse fibers. Some of these separating means are mechanical, some are chemical while still others are a combination of mechanical and chemical separating means. Examples of the mechanical means which have been employed to separate bagasse pith from bagasse fiber can be found in U.S. Patents 2,729,856 and 2,729,858, issued to Horton and Keller. The use of the apparatus and process for separating bagasse pith from bagasse fiber as set forth in these two patents is particularly preferred in accordance with this invention. It should be understood, however, that any known method for separating the bagasse pith from the bagasse fiber can be suitably employed. Other suitable methods and apparatus for separating the pith from the fiber can be found in U.S. Patents 2,723,194; 2,760,234; and 1,501,925.

After the bagasse pith has been separated from the bagasse fiber it may be shredded further or in some instances even ground if desired.

The amount of the bagasse pith employed may range between about 10 and 90% by weight of the final pot composition on the dry basis and preferably between 60 and 65% when no other ingredients are used besides bagasse pith and cellulosic fibrous material. However, when other ingredients such as *Tillandsia usneoides* is used, the amount of bagasse pith preferably ranges between 15 and 45% by weight of the final pot composition on the dry basis.

THE CELLULOSIC FIBROUS MATERIAL

The cellulosic fibrous material of this invention serves to bind the bagasse pith fraction together when these two components are introduced in an aqueous slurry into a mold and molded. While there are a number of cellulosic fibrous materials which can suitably be used in accordance with this invention in order to produce a transplanter pot, such as digested wood pulp, reclaimed corrugated boxes which have been run through a hydropulper, reclaimed newsprint, reclaimed kraft fiber, virgin kraft fiber, etc., I have found that by far the most preferable materials insofar as economy, availability, performance and utility are concerned are digested bagasse fiber and digested *Phragmites communis*. The preferred method of producing the digested bagasse fiber and the digested *Phragmites communis* is to treat these materials with a 2% aqueous solution of sodium hydroxide for from ½ to 2 hours at a pressure between 0 and 45 lbs. per sq. inch. As a general rule the bagasse fiber and *Phragmites communis* can be digested in the same manner that wood pulp is digested, i.e., by the soda process, the sulfide process, the kraft process, acid digestion, mechanical maceration, etc. The "*Phragmites communis*" grows in the fresh water marshes of sub-tropical climates and particularly in Louisiana and is also known as Rose-aux cane or esparto.

The amount of the cellulosic fibrous material may range between about 15 and 60% by weight of the final composition on a dry basis and preferably between about 35 and 45% by weight of the final composition on a dry basis.

THE EXAMPLES IN GENERAL

The examples which follow are illustrative of preferred embodiments of this invention. It should be understood that these examples are not intended to limit the invention and that obvious changes may be made by those skilled in the art without changing the essential characteristics and the basic concept of the invention. The parts and percentages are by weight unless otherwise indicated. The temperature is room temperature and the pressure is atmospheric unless otherwise indicated.

The transplanter pots described in the following examples were formed by a rather simple procedure. First of all, a cup-shaped mold member having a bottom and upwardly diverging circular walls was constructed of screen material having a very small mesh size. This cup-shaped screen mold was then placed within an outer annular cup which surrounded the entire outer side wall and bottom portion of the screen mold. The annular outer cup portion was spaced a short distance away from the screen mold. The upper portion of the annular outer cup formed a seal with the upper rim portion of the screen mold so that when a vacuum was applied to the annular outer cup portion, air would be sucked through the interior portion of the screen mold. Thus, when an aqueous pulp slurry was introduced into the interior of the screen mold, the pulp material in the slurry was drawn to the surface of the screen and held thereon while the aqueous portion of the aqueous pulp slurry was sucked through the screen due to the vacuum being applied. By proceeding in this manner, a suitable molded pulp container was formed on the inside walls and bottom of the screen mold. When the desired thickness of pulp material had been built up on the interior of the screen mold (usually between $\frac{1}{16}$ and $\frac{1}{4}$ inch thick) the further introduction of the aqueous pulp slurry was discontinued. A ram member was thereafter introduced into the interior of the molded container, the lower end of the ram having an inflatable rubber member attached thereto. The inflatable rubber member was caused to be inflated when it was positioned exactly within the interior of the screen mold, thus causing the pulp material deposited on the screen mold to be compressed tightly against the screen and thereby forcing most of the moisture out of the deposited pulp material. When substantially all of the excess water had been pressed out of the deposited pulp material in this manner, the ram member and attached inflatable rubber member were withdrawn and the vacuum on the annular cup device was cut off. The still rather moist molded pulp article was thereafter separated from the screen mold by reverse pressure means (e.g. by blowing air through the screen mold in a direction opposite to that which the water passed through the screen mold). The moist molded pulp transplanter pot was thereafter dried in an oven at 150° F. until there was no further moisture loss. The dried transplanter pot was then removed from the oven.

This invention is not concerned with any criticality in the shape, design or configuration of the mold itself. Accordingly, this invention contemplates the use of molded objects of any size, shape or configuration.

The digested bagasse fiber referred to in the following examples was bagasse fiber which had been treated with a 2% aqueous solution of sodium hydroxide for 45 minutes at atmospheric pressure. In a number of tests it was determined that this digested bagasse fiber material was substantially equivalent to bagasse fiber which had been digested with other chemicals and under different digestion conditions. It was therefore concluded that the digested bagasse fiber as produced above was representative and substantially equivalent to all other types of digested bagasse fibers. Of course, the bagasse fiber, prior to digestion, had been substantially free of all bagasse pith.

Example 1

By using the transplanter pot forming procedure as set forth above, a number of transplanter pots were formed using mixtures of bagasse pith and digested bagasse fibers in different proportions. The aqueous pulp slurry used to form the transplanter pot consisted of about 98.5% water and 1.5% by weight of a mixture of digested bagasse fiber and bagasse pith. The weight percentages given in the runs listed below are the weight percentages of the two ingredients in the final composition on a dry basis.

| Run | Wt. percent digested bagasse fiber | Wt. percent bagasse pith |
|---|---|---|
| 1a | 35 | 65 |
| 1b | 40 | 60 |
| 1c | 45 | 55 |
| 1d | 30 | 70 |
| 1e | 50 | 50 |
| 1f | 25 | 75 |
| 1g | 55 | 45 |
| 1h | 20 | 80 |
| 1i | 60 | 40 |
| 1j | 15 | 85 |

The transplanter pots prepared in runs 1a, 1b, and 1c were considered superior to the pots produced in runs 1g, 1h, 1i, and 1j insofar as overall properties were concerned.

Example 2

By using the transplanter pot forming procedure as set forth above, a number of transplanter pots were formed using mixtures of bagasse pith and digested *Phragmites communis* fibers in different proportions. The aqueous pulp slurry used to form the transplanter pot consisted of about 98.5% water and 1.5% by weight of a mixture of digested *Phragmites communis* fiber and bagasse pith. The weight percents given in the runs listed below are the weight percents of the two ingredients in the final composition on a dry basis.

| Run | Digested *Phragmites communis* fiber (Wt. percent) | Bagasse pith (Wt. percent) |
|---|---|---|
| 2a | 15 | 85 |
| 2b | 60 | 40 |
| 2c | 20 | 80 |
| 2d | 55 | 45 |
| 2e | 25 | 75 |
| 2f | 50 | 50 |
| 2g | 30 | 70 |
| 2h | 45 | 55 |
| 2i | 40 | 60 |
| 2j | 35 | 65 |

Example 3

By using the transplanter pot forming procedure as set forth above, a number of transplanter pots were formed using mixtures of repulped newsprint and bagasse pith in different proportions. The aqueous pulp slurry used to form the transplanter pot consisted of about 98.5% water and 1.5% by weight of a mixture of repulped newsprint and bagasse pith. The weight percents given in the runs listed below are the weight percents of the two ingredients in the final composition on a dry basis.

| Run | Repulped newsprint (wt. percent) | Bagasse pith (wt. percent) |
|---|---|---|
| 3a | 35 | 65 |
| 3b | 40 | 60 |
| 3c | 45 | 55 |
| 3d | 30 | 70 |
| 3e | 50 | 50 |
| 3f | 25 | 75 |
| 3g | 55 | 45 |
| 3h | 20 | 80 |
| 3i | 60 | 40 |
| 3j | 15 | 85 |

Example 4

By using the transplanter pot forming procedure as set forth above, a number of transplanter pots were formed using mixtures of bagasse pith and repulped kraft fiber in different proportions. The aqueous pulp slurry used to form the transplanter pot consisted of about 98.5% water and 1.5% by weight of a mixture of repulped kraft fiber and bagasse pith. The weight percents given in the runs listed below are the weight percents of the two ingredients in the final composition on a dry basis.

| Run | Repulped kraft fiber (wt. percent) | Bagasse pith (wt. percent) |
|---|---|---|
| 4a | 35 | 65 |
| 4b | 40 | 60 |
| 4c | 45 | 55 |
| 4d | 30 | 70 |
| 4e | 50 | 50 |
| 4f | 25 | 75 |
| 4g | 55 | 45 |
| 4h | 20 | 80 |
| 4i | 60 | 40 |
| 4j | 15 | 85 |

Example 5

By using the transplanter pot forming procedure as set forth above, a number of transplanter pots were formed using mixtures of bagasse pith and digested wood pulp fibers in different proportions. The aqueous pulp slurry used to form the transplanter pot consisted of about 98.5% water and 1.5% by weight of a mixture of digested wood pulp fiber and bagasse pith. The weight percents given in the runs listed below are the weight percents of the two ingredients in the final composition on a dry basis.

| Run | Digested wood pulp (wt. percent) | Bagasse pith (wt. percent) |
|---|---|---|
| 5a | 35 | 65 |
| 5b | 40 | 60 |
| 5c | 45 | 55 |
| 5d | 30 | 70 |
| 5e | 50 | 50 |
| 5f | 25 | 75 |
| 5g | 55 | 45 |
| 5h | 20 | 80 |
| 5i | 60 | 40 |
| 5j | 15 | 85 |

THE USE OF *TILLANDSIA USNEOIDES*

It has been further discovered in accordance with the present invention that the inclusion of *Tillandsia usneoxides* in a transplanter pot composition is very beneficial to the overall properties of the transplanter pot. The inclusion of the *Tillandsia usneoides* is particularly beneficial insofar as the growth characteristics of the plant within the pot are concerned.

Although it has heretofore been proposed to incorporate fertilizer ingredients in the walls of a transplanter pot, it has never been proposed to include finely ground *Tillandsia usneoides* into a transplanter pot composition.

As noted earlier in this description, the peat moss which is presently used in nearly all commercial transplanter pots will not decompose unless nitrogenous fertilizers are included—which frequently results in stunted growth of the plant and unsightly fungus growth on the exterior walls of the pot. This all presents a considerable dilemma to manufacturers in that if they include too little nitrogen fertilizer their pots will not decompose and the plant therein will be stunted because the roots cannot penetrate the pot wall—while on the other hand, if too much fertilizer is incorporated in the plant wall, the pot will decompose but the roots will be burned upon contacting the pot wall thus again stunting the growth of the plant.

The transplanter pots of this invention are not beset with the above-mentioned difficulties because first of all the materials used in producing the present transplanter pot, for instance, digested bagasse fiber and bagasse pith, are readily decomposable by fungi without the aid of extraneous fertilizing material. Accordingly, in the transplanter pot of this invention there is no need to introduce potentially harmful nitrogen fertilizers which could stunt or cause the death of the plant.

The *Tillandsia usneoides* which applicant contemplates introducing into his transplanter pot is a completely organic material having high nutrient value for plants. *Tillandsia usneoides* in an epiphyte which is often referred to as Spanish moss. This material grows profusely in sub-tropical climates and particularly in Louisiana. A further advantage accrues by the use of *Tillandsia usneoides* in the transplanter pot wall since the components of *Tillandsia usneoides* are essentially unleachable during ordinary watering operations of such a transplanter pot. *Tillandsia usneoides* is therefore quite different from the soluble inorganic fertilizers of the prior art which will quickly be leached from the walls of the transplanter pot leaving no fertilizer whatsoever.

The amount of the *Tillandsia usneoides* which can be incorporated in applicant's transplanter pot composition may suitably range between about 15 and 45% by weight of the composition on a dry basis. The preferred method for incorporating the fibrous *Tillandsia usneoides* into the aqueous slurry of pulp material which is used to form the transplanter pot is to dry it to water content of about 14% and then break it down in a hammermill to a rather fine powder.

*Example 6*

By using the previously described transplanter pot forming procedure, a number of transplanter pots were formed using mixtures of bagasse pith, digested bagasse fibers and finely powdered *Tillandsia usneoides* in different proportions. The aqueous pulp slurry used to form the transplanter pot consisted of about 98% water and about 2% by weight of a mixture of the above mentioned three ingredients. The weight percents given in the runs listed below are the weight percents of the three ingredients in the final pot composition on a dry basis.

| Run | Digested bagasse fiber (wt. percent) | Bagasse pith (wt. percent) | Tillandsia usneoides (wt. percent) |
| --- | --- | --- | --- |
| 6a | 35 | 30 | 35 |
| 6b | 40 | 30 | 30 |
| 6c | 35 | 25 | 40 |
| 6d | 35 | 40 | 25 |
| 6e | 45 | 35 | 20 |
| 6f | 40 | 45 | 15 |
| 6g | 50 | 20 | 30 |
| 6h | 25 | 30 | 45 |
| 6i | 60 | 20 | 20 |

Transplanter pots produced from the above compositions exhibited superior properties insofar as the growth of plants within the pot were concerned. There was no evidence whatsoever of plant roots being burned and root growth was very vigorous.

Between 15-45 wt. percent of *Tillandsia usneoides* was also incorporated in the compositions set forth in Examples 2, 3, 4 and 5 with similarly good results. Plant and root growth was noticeably improved in every instance where *Tillandsia usneoides* was added.

IMPROVING THE WET-STRENGTH OF TRANSPLANTER POTS

Since transplanter pots are frequently handled in a moistened or wet condition, it is highly desirable that the transplanter pots possess good wet strength. If the transplanter pots possess good wet strength they can be handled by the grower without exercising a great degree of care and they can be shipped in a moistened condition without fear of damage. The transplanter pots of this invention preferably have their wet strength increased by incorporating any of the well-known resinous substances employed to increase the wet strength of paper products. This may be achieved by adding such a resinous substance to the other ingredients of the transplanter pot either before, during, or after the ingredients are formed into a pot. By way of example, synthetic resins, such as phenol-formaldehyde, urea-formaldehyde, or the like may be so employed in a manner and in a quantity which will be readily understood by those skilled in the art of paper making.

Particularly preferred resins are the "Kymenes" resins made by the Hercules Powder Co. of Wilmington, Delaware. However, one requirement with regard to a number of these resins is that they must be adjusted to the pH of the transplanter pot (which is about 6). Some resins contain a higher percentage of nitrogen than others. "Kymene-234" made by the Hercules Powder Company is a strongly cationic synthetic resin designed for use in the manufacture of wet-strength paper. It has been proved effective for use in paper and paperboard, and because of its highly cationic nature and other properties, should find other industrial applications. It has 27% nitrogen (Kjeldahl) on a dry basis in the form of urea-formaldehyde but it is only suitable at a pH of 4.5 to 5.0 if it is to give the best wet strength. "Kymene-557," also made by the Hercules Powder Company, is the latest addition to the Hercules group of wet-strength resins. This new resin is designed for use in papermaking systems that operate under any pH condition. It is particularly effective in the pH range of 6 to 10, has 12.8% nitrogen content (Kjeldahl) and is cationic.

The amount of wet strength resin which can be introduced into the transplanter pot composition may range between .01% and 15% but usually about .5% to 1.5% by weight is quite satisfactory. The wet strength resin is preferably in a water solution so as to be readily soluble when incorporated in the slurry which is used to make the transplanter pot or it may be introduced into the transplanter pot after it has been formed in the mold. In some instances, the application of a heat treatment is desirable in order to cause the wet strength resin to exert its most beneficial effects insofar as strength is concerned.

*Example 7*

In order to demonstrate the great advantages to be obtained by incorporating certain wet strength resins in the transplanter pot compositions of this invention, 1% by weight of "Kymene-557" was incorporated in a number of different compositions corresponding to runs 1a, 1b, 1c, 1d, 2g, 2h, 2i, 2j, 3b, 3c, 4a, 4c, 5b, 5c, 5d, 6a, 6c, 6d, and 6f. In each case the addition of this resin greatly improved the wet strength of the transplanter pot. The great strength of the so produced transplanter pot could be demonstrated by thoroughly wetting the transplanter pot, folding the transplanting pot up into a crinkled mass and thereafter releasing the transplanter pot whereupon it can be observed that the transplanter pot almost always returns to its original shape without apparent ill effects and without disintegration or tearing apart. High strength of this sort permits the transplanter pot to be moved about and handled many times on the growing bench or display rack if desired and without breaking.

THE INCORPORATION OF OTHER MATERIALS

It is also contemplated within the scope of this invention that other materials may be added to the foregoing transplanter pot compositions. In particular, it is contemplated that fungicides, anti-mildew agents and anti-mold agents can be added to the transplanter pot composition in order to destroy or inhibit the action of fungus and related organisms. The incorporation of fungicides is particularly desirable from several points of view. First of all, when florists display plants or flowers in small transplanter pots for their customers it is often quite important that the exterior of the transplanter pot wall not contain an unsightly mold or fungus since this will frequently cause the customer to be reluctant to handle or pick up the transplanter pot. Secondly, the incorporation of a fungicide is beneficial in that by destroying the fungi which are present in the transplanter pot wall, the walls are thereby protected against premature decay and deterioration, the time of protection of course depending upon the amount of fungicide added to the transplanter pot wall. If a sufficient amount of fungicide is added the useful life of the pot can be extended to between 10 and 180 days. Water insoluble fungicides are preferred since they are not easily leached out when the transplanter pot is watered. Examples of some suitable fungicidal agents are ferric dimethyldithiocarbamate, pentachloronitrobenzene, and copper phosphate.

The amounts of the fungicidal agent incorporated may range between about .1% to 10% and preferably between about .5% to 3.0%. Fungicides are preferred which have a broad spectrum for weak saprophytic molds that cause slight discoloration of the pot.

Also, the incorporation of a fungicide is desirable since the elimination of fungus means that the fungi will not be able to compete with the plant in the pot for the available nitrogen in the soil.

Particularly preferred fungicides are "Fermate," an organo-metallic fungicide in the form of a finely divided wettable powder consisting of 70% ferric dimethyldithiocarbamate and 30% conditioning agent, which is manufactured by Du Pont. Also, quite suitable is the product "Terraclor" (pentachloronitrobenzene), a 75% wettable powder sold by the Olin Mathieson Chemical Corporation. Other suitable fungicides include Vancide 51 and Dowicide A (sodium o-phenylphenate).

It should be noted that it is not possible to incorporate fungicides in the present commercial transplanter pot compositions containing peat moss since if fungicides are incorporated the peat moss will not decompose sufficiently for the plant roots to penetrate through the pot wall.

It is also contemplated within the scope of this invention that various materials may be added to the transplanter pot in order to decrease the decomposition rate of the pot. In addition to the above-mentioned fungicides, such decomposition deaccelerators would include Louisiana peat moss, etc.

It is also possible that other types of fertilizers may be added if desired.

RELATED INVENTIONS

I have made other inventions which appear to be closely related to the invention described above and these other inventions broadly comprise products made from bagasse fiber alone and bagasse pulp alone. The product made from bagasse fiber alone is a bath mat or shower mat which is designed for one time throw away use in hotels, motels, etc. A thick slurry of bagasse fiber can be rolled or otherwise formed into a relatively thin sheet of the desired mat size. This sheet is then passed through an oven or drier until the resulting product is dry and hard. Such a product, preferably together with suitable amounts of binding water-resistant resin, can be used as a very inexpensive bath mat or shower mat in hotels and motels.

Another invention which is believed to be closely related to the present invention is a seed mat comprising a plurality of seeds dispersed in a desired pattern throughout a blanket or sheet of bagasse pith. Such a blanket of seeds, which blanket may be reinforced with small amounts of a water-resistant resin, can be used by home gardeners or farmers in order to achieve the desired distribution of seeds in the ground. The bagasse pith is not only extremely inexpensive but in addition eventually decays in the soil so as to stimulate plant growth. The mat of bagasse pith is porous enough so that either rootlet or sprout growth is not hindered.

It should also be mentioned that I have discovered another (and entirely different) combination of components which is useful for many products, such as transplanter pots, shower mats, egg cartons, etc. This additional composition comprises a combination of chemically pulped bagasse fiber and peat or another type of vegetable material. The chemically pulped bagasse fiber may be present in an amount ranging between 5 and 95% by weight and the peat or other fiber may likewise be present in an amount ranging between 5 and 95% by weight. This combination differs from the compositions described in previous paragraphs in that it does not contain bagasse pith. It may be molded or otherwise formed into shapes by conventional molding processes.

MISCELLANEOUS

While this invention has been particularly described with reference to transplanter pots, it will be readily appreciated that the particular components and combination of components here described could very well have considerable utility in the production of other products and particularly other molded products, such as molded pulp plates, molded pulp egg cartons, etc. It is applicant's specific intention to cover all structures which one skilled in the art would recognize as being equivalent or similar in use, function or appearance.

It will be further understood that whereas specific ranges have been set forth for the amounts of each ingredient which has been disclosed, no invention would be involved in experimenting with amounts outside these ranges in order to see whether they would or would not be suitable, and to the extent that amounts outside the specified ranges are suitable, it is intended that they should fall within the scope of this patent.

The pH of the transplanter pots of this invention should preferably range between about 6 and 7.

What I claim is:

1. A composite molded product comprising an admixture of about 10–90% by weight of undigested bagasse pith and about 15–60% by weight of a cellulosic fibrous pulp material.

2. A composite product according to claim 1 wherein said cellulosic fibrous material is selected from the group consisting of digested bagasse fiber, digested *Phragmites communis*, digested wood pulp, reclaimed newsprint and reclaimed kraft fiber.

3. A composite product according to claim 1 which is in the form of a transplanter pot.

4. A composite product according to claim 2 which is in the form of a transplanter pot.

5. A transplanter pot according to claim 4 which additionally contains *Tillandsia usneoides* and a wet strength resin.

6. A transplanter pot composition according to claim 4 which additionally contains *Tillandsia usneoides* and a fungicide.

7. A transplanter pot composition according to claim 6 which additionally contains a wet strength resin.

8. A transplanter composition according to claim 7 which additionally contains an organic material.

9. A transplanter composition according to claim 7 wherein said organic material is peat moss.

References Cited in the file of this patent

UNITED STATES PATENTS

| | | |
|---|---|---|
| 1,776,016 | Alvord | Sept. 16, 1930 |
| 1,944,788 | Genz | Jan. 23, 1934 |
| 2,004,706 | Nuske | June 11, 1935 |
| 2,728,169 | Spengler | Dec. 27, 1955 |
| 2,858,647 | Cotton | Nov. 4, 1958 |